(12) United States Patent
Francois et al.

(10) Patent No.: US 9,167,266 B2
(45) Date of Patent: Oct. 20, 2015

(54) METHOD FOR DERIVING MOTION FOR HIGH RESOLUTION PICTURES FROM MOTION DATA OF LOW RESOLUTION PICTURES AND CODING AND DECODING DEVICES IMPLEMENTING SAID METHOD

(75) Inventors: Edouard Francois, Bourg des Comptes (FR); Vincent Bottreau, Chateaubourg (FR); Jérôme Vieron, Bédée (FR); Christophe Chevance, Brécé (FR)

(73) Assignee: Thomson Licensing, Boulogne-Billancourt (FR)

( * ) Notice: Subject to any disclaimer, the term of this patent is extended or adjusted under 35 U.S.C. 154(b) by 818 days.

(21) Appl. No.: 12/309,159

(22) PCT Filed: Jul. 2, 2007

(86) PCT No.: PCT/EP2007/056640
§ 371 (c)(1),
(2), (4) Date: May 21, 2009

(87) PCT Pub. No.: WO2008/006728
PCT Pub. Date: Jan. 17, 2008

(65) Prior Publication Data
US 2009/0323811 A1    Dec. 31, 2009

(30) Foreign Application Priority Data

Jul. 12, 2006 (EP) .................................... 06300798

(51) Int. Cl.
*H04N 7/26* (2006.01)
*H04N 19/59* (2014.01)
(Continued)

(52) U.S. Cl.
CPC ............. *H04N 19/59* (2014.11); *H04N 19/112* (2014.11); *H04N 19/16* (2014.11); *H04N 19/33* (2014.11); *H04N 19/517* (2014.11)

(58) Field of Classification Search
CPC ................................................ H04N 19/00781
USPC ........................................ 375/240.01, 240.16
IPC .......................................................... H04N 7/12
See application file for complete search history.

(56) References Cited

U.S. PATENT DOCUMENTS 5,831,678 A   11/1998  Proctor
5,978,509 A   11/1999  Nachtergaele et al.
(Continued)

FOREIGN PATENT DOCUMENTS

EP    0577337    1/1994
EP    0883300    12/1998
(Continued)

OTHER PUBLICATIONS

J. Vieron et al. "CE4: Inter-layer prediction for interlace/progressive SVC" Joint Video Team (JVT) of ISO/IEC MPEG & ITU-T VCEG (ISO/IEC JTC1/SC29/WG11 and ITU-T SG16 Q.6), 19th Meeting Geneva, Switzerland, Apr. 1-7, 2006, pp. 1-16, XP002410927.

(Continued)

*Primary Examiner* — Jay Patel
*Assistant Examiner* — Yulin Sun
(74) *Attorney, Agent, or Firm* — Robert D. Shedd; Vincent E. Duffy; James McKenzie

(57) ABSTRACT

The invention relates to a method for deriving motion data for a macroblock divided in elementary blocks of a high resolution picture, called high layer macroblock, from motion data of macroblocks of a low resolution picture, called base layer macroblock. The method comprises the following steps:
  computing, for each elementary block, an intermediate position within the low resolution picture from the elementary block position depending on the coding modes of the high layer macroblock and of the high and low resolution pictures;
  identifying the base layer macroblock, called base_MB, comprising the pixel located at the intermediate position;
  computing a final position within the low resolution picture from the virtual base layer position depending on the coding modes of the base_MB, of the high layer macroblock;
  identifying the base layer macroblock, called real_base_MB, comprising the pixel located at the final position; and
  deriving motion data, for the high layer macroblock, from motion data of the identified real_base_MB.

18 Claims, 4 Drawing Sheets

(51) Int. Cl.
*H04N 19/112* (2014.01)
*H04N 19/16* (2014.01)
*H04N 19/33* (2014.01)
*H04N 19/517* (2014.01)

(56) References Cited

U.S. PATENT DOCUMENTS

| | | | |
|---|---|---|---|
| 6,233,283 B1 | 5/2001 | Chiu et al. | |
| 6,400,768 B1 | 6/2002 | Nagumo et al. | |
| 6,510,177 B1 | 1/2003 | De Bonet et al. | |
| 6,580,832 B1 | 6/2003 | Kim et al. | |
| 6,639,943 B1 | 10/2003 | Radha et al. | |
| 6,690,724 B1 | 2/2004 | Kadono | |
| 6,728,317 B1* | 4/2004 | Demos | 375/240.21 |
| 6,741,748 B1 | 5/2004 | Son et al. | |
| 6,957,350 B1 | 10/2005 | Demos | |
| 6,980,667 B2 | 12/2005 | Hamanaka | |
| 7,477,690 B2 | 1/2009 | Wang et al. | |
| 7,777,812 B2 | 8/2010 | Sun | |
| 7,929,610 B2 | 4/2011 | Sun | |
| 2001/0012322 A1 | 8/2001 | Nagaoka et al. | |
| 2002/0001411 A1 | 1/2002 | Suzuki et al. | |
| 2002/0009141 A1 | 1/2002 | Yamaguchi et al. | |
| 2002/0051581 A1 | 5/2002 | Takeuchi et al. | |
| 2002/0150158 A1 | 10/2002 | Wu et al. | |
| 2003/0012279 A1 | 1/2003 | Chaddha | |
| 2003/0169932 A1 | 9/2003 | Li et al. | |
| 2004/0202250 A1 | 10/2004 | Kong et al. | |
| 2004/0264791 A1 | 12/2004 | Jiang et al. | |
| 2005/0008079 A1 | 1/2005 | Boon et al. | |
| 2005/0030205 A1 | 2/2005 | Konoshima et al. | |
| 2005/0129122 A1 | 6/2005 | Booth et al. | |
| 2005/0175101 A1 | 8/2005 | Honda et al. | |
| 2005/0207492 A1 | 9/2005 | Pao | |
| 2006/0012719 A1 | 1/2006 | Karczewicz et al. | |
| 2006/0083308 A1 | 4/2006 | Schwarz et al. | |
| 2006/0088102 A1 | 4/2006 | Lee | |
| 2006/0126734 A1 | 6/2006 | Wiegand et al. | |
| 2006/0133475 A1 | 6/2006 | Bruls et al. | |
| 2006/0133510 A1 | 6/2006 | Saxena et al. | |
| 2006/0140269 A1 | 6/2006 | Bruls | |
| 2006/0176955 A1 | 8/2006 | Lu et al. | |
| 2006/0209959 A1 | 9/2006 | Sun | |
| 2006/0221418 A1* | 10/2006 | Lee et al. | 358/539 |
| 2006/0222070 A1 | 10/2006 | Park et al. | |
| 2006/0262860 A1* | 11/2006 | Chou et al. | 375/240.24 |
| 2007/0230914 A1 | 10/2007 | Garrido et al. | |

FOREIGN PATENT DOCUMENTS

| | | |
|---|---|---|
| EP | 1811786 | 7/2007 |
| JP | 06133290 | 5/1994 |
| JP | 06209468 | 7/1994 |
| JP | 11018085 | 1/1999 |
| JP | 2000013790 | 1/2000 |
| JP | 2001500674 | 1/2001 |
| JP | 2003531514 | 10/2003 |
| JP | 2007081983 | 3/2007 |
| JP | 2008536440 | 9/2008 |
| KR | 19970064259 | 12/1996 |
| KR | 20050031460 | 4/2005 |
| KR | 20060043209 | 3/2007 |
| RU | 2201654 | 1/2007 |
| WO | WO9728507 | 8/1997 |
| WO | W09933273 | 7/1999 |
| WO | WO0177871 | 10/2001 |
| WO | W02004014083 | 2/2004 |
| WO | WO2004080079 | 9/2004 |
| WO | WO2006110013 | 10/2006 |

OTHER PUBLICATIONS

Reichel et al. "Joint Scalable Video Model JSVM-5" Joint Video Team (JVT) of ISO/IEC MPEG & ITU-T VCEG (ISO/IEC JTC1/SC29/WG11 and ITU-T SG16 Q.6), 19th Meeting Geneva, Switzerland, Apr. 1-7, 2006, XP002410928.

Search Report Dated Jan. 31, 2008.

Francois, et al., "Generic Extended Spatial Scalability", JVT of Isomeric MPEG & ITU-T VCEG, Oct. 18, 2004, pp. 1-37.

Nt'l. Organization for Standardization, "Description of Core Experiments in SVC", ISO/IEC JTC1/SC29/WG11/N6898, Hong Kong, Jan. 2005, pp. 1-106.

Reichel et al., "Joint Scalable Video Model JSVM-4", JVT of ISO/IEC MPEG & ITU-T VCEG, Oct. 31, 2005, pp. 1-41.

Reichel et al.., Joint Scalable Video Model JSVM-2, Joint Video Team of ISO/IEC MPEG & ITU-T VCEG, Apr. 22, 2005, pp. 1-31.

Reichel et al., "Joint Scalable Model JSVM 0", Joint Video Team of ISO/IEC MPEG & ITU-T, Jan. 17, 2005, pp. 1-73.

Francois et al., "Extended Spatial Scalability with a 3/2 Size Ratio", ISO/IEC JTC1/WG11 MPEG2005/M11958, Apr. 13, 2005, pp. 1-34.

Reichel et al., "Joint Scalable Video Model (JSVM) 1.0 Reference Algorithm Description," ISO/IEC JTC 1/SC 29/WG 11, N6899, Jan. 2005, Hong Kong, China, pp. 1-39.

Wee et al., Field-to-Frame Transcoding with Spatial and Temporal Downsampling, 1999 International Conference on Image Processing, ICIP 99, vol. 4 Oct. 24, 1999, pp. 271-275.

Segall, C. Andrew, et al. "Spatial scalability within the H. 264/AVC scalable video coding extension." Circuits and Systems for Video Technology, IEEE Transactions on vol. 17 no. 9 pp. 1121-1135, 2007.

Francois, Edouard, et al. "Interlaced coding in SVC." Circuits and Systems for Video Technology, IEEE Transactions on vol. 17, no. 9, pp. 1136-1148, 2007.

Francois, Edouard, et al. "Extended spatial scalability: a generalization of spatial scalability for non dyadic configurations." Image Processing, 2006 IEEE International Conference on. pp. 169, 172, 2006.

Marquant, Gwenaelle, et al. "Extended spatial scalability for non dyadic video formats: from SDTV to HDTV." Visual Communications and Image Processing 2005. Proceedings of the SPIE, vol. 5960, pp. 547-558, 2005.

Francois et al: "Core experiments on Extended Spatial Scalability (CE-10)", 29 Jun. 2005, pp. 1-21, XP55072291, Retrieved from the internet: URL:http://wftp3.itu.int/av-arch/jvt-site/2005_04_Busan/ [retrieved on 2013-07-22].

Bao et al: "FGS coding with adaptive reference for low-delay applications", Proc. Int. conf. on Image proc. (ICIP2006), Atlanta, Usa, Oct. 2006.

Bayrakeri et al: "MPEG-2 nonlinear temporally scalable coding and hybrid quantization", Proc. Int. Conf. on Acoustics, Speech, and Signal Processing (ICASSP'97), vol. 4, pp. 2629-2632, Apr. 1997.

Dugad et al: "A Scheme for Spatial Scalability Using Nonscalable Encoders", IEEE Trans. Circuits and Systems for Video Technology, vol. 13, n. 10, pp. 993-999, Oct. 2003.

Ebu Technical Review, "HDTV format wars", n. 301, Jan. 2005, http://www.ebu.ch/en/technical/trev/trev_301- editorial.html.

Flier! et al: "Generalized B Pictures and the Draft JVT1H.264 Video Compression standard", IEEE Trans. on Circuits and Systems for Video Technology, vol. 13, pp. 1-12, Jul. 2003.

Francois et al: "Extended Spatial Scalability: a generalization of spatial scalability for SVC extension of AVC/H.264", in Proc. Picture Coding Symp. (PCS'06), Beijing, China, Apr. 2006.

Francois et al: "Extended Spatial Scalability: a generalization of spatial scalability for non dyadic configurations", in Proc. Int. Conf. on Image Proc. (ICIP 2006), Atlanta, Usa, Oct. 2006.

ITU T recommendations H264 & ISO/IEC 14496-10 AVC: "Advanced video coding for generic audiovisual services" Version 4, Year 2005.

Vincent et al "Spatial prediction in scalable video coding", Int. Broadcasting Conf. (IBC'95), pp. 244-249, Communications Research Centre, Canada.

Puri et al: "Spatial Domain Resolution Scalable Video Coding", Proc. Spie, vol. 2094, pp. 718-729, in Proc. Visual Com. Image Proc. (VCIP'93), Boston, Ma, Nov. 1993.

Puri et al: "Temporal resolution scalable video coding, Image Processing", in Proc. Int. Conf. on Image Proc. ( ICIP'94), 1994, vol. 2, pp. 947-951, Nov. 1994.

(56) References Cited

OTHER PUBLICATIONS

Schwarz et al: "Analysis of hierarchical B pictures and MCTF", in Proc. IEEE International Conference on Multimedia and Expo (ICME'06), Toronto, Ontario, Canada, Jul. 2006.

Schwarz et al: "Constrained inter-layer prediction for single-loop decoding in spatial scalability", in Proc. Int. Conf. on Image Proc. (ICIP 2005), Genova, Italy, Sep. 2005.

Segall et al: "Resampling for Spatial Scalability", in Proc. Int. Conf. On Image Proc. (ICIP 2006), Atlanta, USA, Oct. 2006.

Bruls et al: "Bridging the interlace and progressive controversy using a progressive enhancement stream on top of the interlace stream and a new de-interlace algorithm", in Proc. Int. Conf. on Consumer Electronics (ICCE 2005), pp. 5-6, Jan. 2005.

Wiegand et al:" Overview of the H.264/AVC video coding standard", IEEE Trans. on Circuits and Systems for Video Technology, vol. 13, no. 7, pp. 560-576, Jul. 2003.

Schwarz et al: "Overview of the Scalable Video Coding Extension of the H.264/AVC Standard", IEEE Transactions on Circuits and Systems for Video Technology, Vol. 17, No. 9, September 2007.

JVT-R202-JSVM: "Joint scalable Video Model JSVM-5", JVT of ISO/IEC MPEG & ITU-T VcCEG, 18th meeting, Bangkok, Thailand, 14-20 Jan. 2006.

Draft ISO/IEC14496-10 (2006): "Joint scalable video model JSVM-6"JVT of ISO/IEC MPEG & ITU-T VCEG, 19th meeting, Geneva, Switzerland, 1-7 Apr. 2006.

ISO IEC 14496_2 3rd edition. Information technology - Coding of audiovisual objects - Part 2: visual.

Bayrakeri et al: "MPEG2/ECVQ look ahead hybrid quantization and spatially scalable coding", Proc. SPIE vol. 3024, pp. 129-137, Visual communications and image processing 1997, Jan Biemond, Edward J. Delp. Eds.

Hinz et al: "FGS for field picture and MFAFF frames", JVT of ISO/IEC MPEG & ITU-T VCEG JVT-R062, 18th meeting, Bangkok, Thailand, Jan. 2006.

Hinz et al: "First concept for inter layer prediction with MBAFF frames", JVT of ISO/IEC Mpeg & ITU-T VGEC ISO IEC 13818_2, ITU-T and ISO/IEC JTC1: "Generic coding of moving pictures and associated audio information - Part 2: Video", ITU-T recommendation H.262,.

Sun et al: "Unified solution for spatial scalability", JVT of ISO/IEC Mpeg & ITU-T VCEG JVT-R018, 18th meeting, Bangkok, Thailand, Jan. 2006.

Sun et al: "Resampling process for interlaced materials in SVC", JVT-R019, JVT of ISO/IEC MPEG & ITU-T VCEG JVT-R019, 18th meeting, Bangkok, Thailand, Jan. 2006.

Wan et al: "Adaptive format conversion for scalable video coding", in Proc SPIE, vol. 4472, Applications of digital image processing XXIV, Andrew G. Teschler, Editor, pp. 390-401, Dec 2001.

Wang et al: "MB Level adaptive frame_field coding for JVT", JVT of ISO/IEC MPEG & ITU-T VCEG JVT-B106, 2nd meeting, Geneva, Switz, Jan 2002.

Winken et al: "Adaptive motion refinement for FGS slices" JVT, doc. JVT-Q031, Nice, France, Oct. 2005.

Schwarz et al: SVC Core Experiment 2.4: Adaptive spatial transforms, ISO/IEC JTC 1/SC 29/ WG 11/ M11052, Jul. 2004.

* cited by examiner

METHOD FOR DERIVING MOTION FOR HIGH RESOLUTION PICTURES FROM MOTION DATA OF LOW RESOLUTION PICTURES AND CODING AND DECODING DEVICES IMPLEMENTING SAID METHOD

This application claims the benefit, under 35 U.S.C. §365 of International Application PCT/EP2007/056640, filed Jul. 2, 2007, which was published in accordance with PCT Article 21(2) on Jan. 17, 2008 in English and which claims the benefit of European patent application No. 06300798.3, filed Jul. 12, 2006.

1. FIELD OF THE INVENTION

The invention relates to a method for deriving motion data for at least one macroblock of a high resolution picture, called high layer macroblock, from motion data associated to at least one macroblock of a low resolution picture, called base layer macroblock. The invention also relates to coding and decoding devices implementing said method.

2. BACKGROUND OF THE INVENTION

State-of-art scalable hierarchical coding methods allow encoding the information hierarchically in order that it can be decoded at different resolution and/or quality levels. A data stream generated by a scalable coding device is thus divided into several layers, a base layer and one or more enhancement layers. These devices allow adapting a unique data stream to variable transmission conditions (bandwidth, error rate . . . ) and also to the capacities of reception devices (CPU, characteristics of reproduction device . . . ). A spatially scalable hierarchical encoding (or decoding) method encodes (or decodes) a first part of data called base layer relating to low resolution pictures also called base layer pictures (BL pictures), and from this base layer encodes (or decodes) at least another data part called enhancement layer relating to high resolution pictures also called high layer pictures (HL pictures) or enhancement layer pictures. The motion data relating to the enhancement layer is possibly inherited (i.e. derived) from motion data relating to the base layer by a method called inter-layer prediction method or inter-layer inheriting method. Therefore each macroblock of a high resolution picture is predicted either according to a classical spatial or temporal prediction mode (e.g. intra prediction, bidirectional prediction mode, direct prediction mode, forward/backward prediction . . . ) or according to an inter-layer prediction mode. In this former case, motion data associated to a high resolution macroblock has to be derived or inherited from motion data (also called motion information) associated to macroblocks of low resolution pictures whatever the format of the low or high resolution pictures is, i.e. progressive or interlace. In this context the expression "motion data" includes not only motion vectors but more generally coding information such as partitioning pattern associated to macroblock/block of pixels of the high resolution picture for splitting said macroblock/block into several sub-blocks, coding modes associated to said blocks and picture reference indices associated to some blocks allowing to reference the picture used to predict said block.

3. SUMMARY OF THE INVENTION

The invention has the aim of alleviating at least one of these drawbacks. In particular it relates to a method for deriving motion data for at least one macroblock of a high resolution picture, called high layer macroblock, from motion data associated to macroblocks of a low resolution picture, called base layer macroblock, a macroblock coding mode among frame mode and field mode being associated to each macroblock and a picture coding mode being associated to the high resolution picture and to the low resolution picture. The method comprises the following steps:

- dividing the high layer macroblock in non-overlapping elementary blocks;
- computing, for each elementary block, an intermediate position within the low resolution picture, called virtual base layer position (vbl_pos), from the elementary block position within the high resolution picture depending on the coding mode of the high layer macroblock and depending on the picture coding modes of the high and low resolution pictures;
- identifying, for each elementary block, the base layer macroblock, called base_MB, comprising the pixel located at the virtual base layer position;
- computing, for each elementary block, a final position within the low resolution picture, called real base layer position, from the virtual base layer position depending on the coding modes of the base_MB and high layer macroblocks and depending on the picture coding modes of the high and low resolution pictures;
- identifying, for each elementary block, the base layer macroblock, called real_base_MB, comprising the pixel located at the real base layer position; and
- deriving motion data, for the high layer macroblock, from motion data of the identified base layer macroblock real_base_MB for each elementary block.

According to a preferred embodiment, base layer macroblocks are partitioned and motion data is associated to each of the partitions. Said method further comprises a step for identifying, for each elementary block, the partition (mbPartIdxBase) of the real_base_MB comprising the pixel located at the real base layer position after the step for identifying, for each elementary block, the base layer macroblock, called real_base_MB, comprising the pixel located at the real base layer position.

Preferentially, the step for deriving motion data for the high layer macroblock comprises the steps of:

- partitioning the high layer macroblock depending on the identified base layer macroblock real_base_MB and on the identified partitioning of the base layer macroblock real_base_MB for each elementary block; and
- deriving motion vectors for each partition of the high layer macroblock from motion data of the identified base layer macroblock real_base_MB for each elementary block.

According to a preferred embodiment, the high layer macroblock is a block of 16 by 16 pixels and wherein each elementary block is a block of 4 by 4 pixels.

Advantageously, the method is part of a process for coding video signals and is part of a process for decoding video signals.

The invention also relates to a device for coding a sequence of high resolution pictures and a sequence of low resolution pictures, each picture being divided in non overlapping macroblocks, a macroblock coding mode among frame mode and field mode being associated to each macroblock and a picture coding mode being associated to the high resolution pictures and to the low resolution pictures. The coding device comprises:

- first coding means for coding the low resolution pictures, the first coding means generating motion data for macroblocks of the low resolution pictures and a base layer data stream;

inheritance means for deriving motion data for at least one macroblock of a high resolution picture, called high resolution macroblock from motion data of macroblocks a low resolution picture, called low resolution macroblocks; and second coding means for coding the high resolution pictures using the derived motion data, the second coding means generating an enhancement layer data stream.

The invention also relates to a device for decoding at least a sequence of high resolution pictures, the coded pictures arising in the form of a data stream, each picture being divided in non overlapping macroblocks, a macroblock coding mode among frame mode and field mode being associated to each macroblock and a picture coding mode being associated to the high resolution pictures and to the low resolution pictures. The decoding device comprises:

first decoding means for decoding at least a first part of the data stream in order to generate low resolution pictures and motion data for macroblocks of the low resolution picture;

inheritance means for deriving motion data for at least one macroblock of a high resolution picture from motion data of macroblocks of a low resolution picture; and second decoding means for decoding at least a second part of the data stream using the derived motion data in order to generate high resolution pictures;

According to an important feature of the invention, the inheritance means of the coding and of the decoding devices comprise:

means for dividing the high layer macroblock in non-overlapping elementary blocks;

means for computing, for each elementary block, an intermediate position within the low resolution picture, called virtual base layer position (vbl_pos), from the elementary block position within the high resolution picture depending on the coding mode of the high layer macroblock and depending on the picture coding modes of the high and low resolution pictures;

means for identifying, for each elementary block, the base layer macroblock, called base_MB, comprising the pixel located at the virtual base layer position;

means for computing, for each elementary block, a final position within the low resolution picture, called real base layer position, from the virtual base layer position depending on the coding modes of the base_MB and high layer macroblocks and depending on the picture coding modes of the high and low resolution pictures;

means for identifying, for each elementary block, the base layer macroblock, called real_base_MB, comprising the pixel located at the real base layer position; and means for deriving motion data, for the high layer macroblock, from motion data of the identified base layer macroblock real_base_MB for each elementary block.

Preferentially, the first coding means are an MPEG-4 AVC video encoder.

Advantageously, the coding device further comprises means for combining base layer data stream and enhancement layer data stream into a single data stream.

Preferentially, the first decoding means are an MPEG-4 AVC video decoder.

4. BRIEF DESCRIPTION OF THE DRAWINGS

Other features and advantages of the invention will appear with the following description of some of its embodiments, this description being made in connection with the drawings in which.

5. DETAILED DESCRIPTION OF THE PREFERRED EMBODIMENTS

Figure 1:
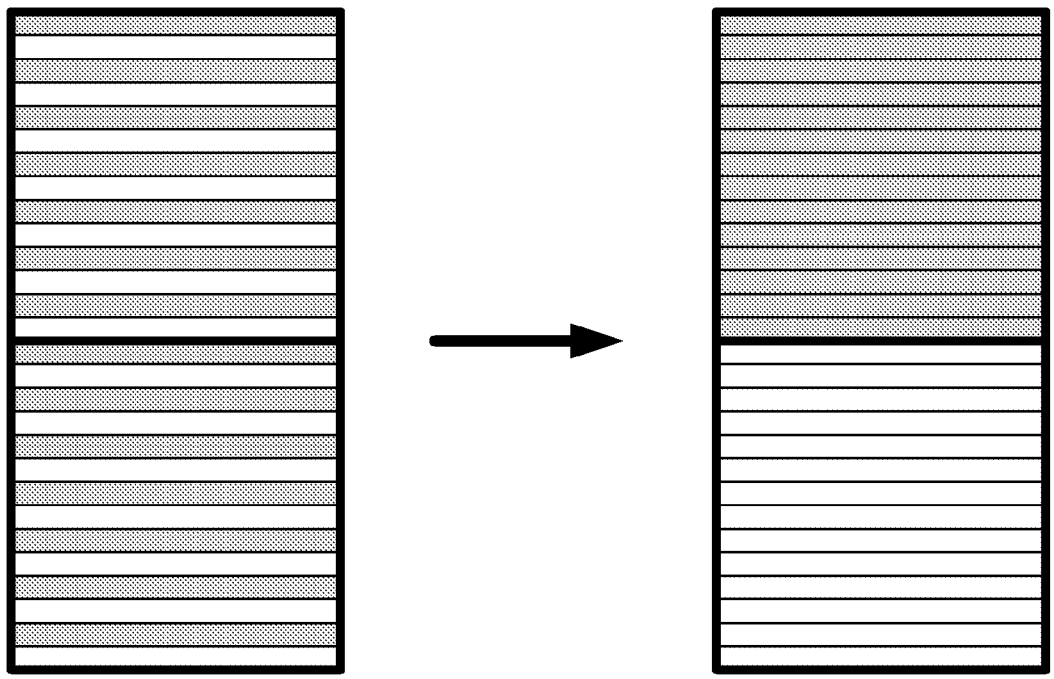
FIG. 1 depicts a pair of macroblocks located vertically and coded either in frame mode (left part of the figure) or in field mode (right part of the figure)

In the SVC standard currently defined by JVT (MPEG & ITU) in the document JVT-R202 from ISO/IEC MPEG & ITU-T VCEG entitled << Scalable Video Coding-Joint Draft 5>> and referenced as JSVM5 in the sequel, the spatial scalability is only considered for progressive material. Motion inter-layer prediction between two (or more) successive spatial layers (the base one and enhancement one(s)) are only addressed in case of progressive video sequences. The invention proposes to extend these inter-layer prediction methods in order to support any combinations of interlace/progressive scalability. According to many video coding standards an interlace picture, which comprises a top field interlace with a bottom field captured at different time instant, may be coded either as two field pictures (field picture mode), i.e. the two fields of the picture are coded separately, or as a frame picture (frame picture mode), i.e. the picture is coded as a single frame. MPEG-4 AVC described in the document ISO/IEC JTC 1/SC 29/WG 11 N5546 entitled << Text of 14496-2 Third Edition>> allows that decision to be made either independently for the entire picture or independently for every two vertical macroblock-pair. When the decision is made at picture level it is called PAFF coding (PAFF stands for Picture Adaptative Frame/Field) and when the decision is made at macroblock-pair level it is called MBAFF (stands for Macroblock Adaptative Frame/Field). More precisely, according to MPEG-4 AVC, when an interlace picture is encoded as a frame picture and if MBAFF is allowed, then each pair of vertical macroblocks (MBs) may be encoded as interlace, i.e. MBs of the pair are encoded in field mode (right part of the FIG. 1), or as progressive, i.e. MBs of the pair frame mode (left part of the FIG. 1). On FIG. 1, the grey lines represent the even lines of the pictures interlace with the odd lines, i.e. the white lines, of the pictures. A progressive picture is always encoded as a frame picture. The coding mode of a picture specifies if said picture is frame or field coded and furthermore if it is frame coded if MBAFF is allowed.

The method according to the invention allows to derive directly motion data for at least one macroblock of the high resolution picture (also called High Layer MacroBlock and noted HL MB) from motion data associated to macroblocks of the low resolution pictures (also called Base Layer MacroBlock and noted BL MB) whatever the format (interlace or progressive) of the high and low resolution sequences.

Figure 2:
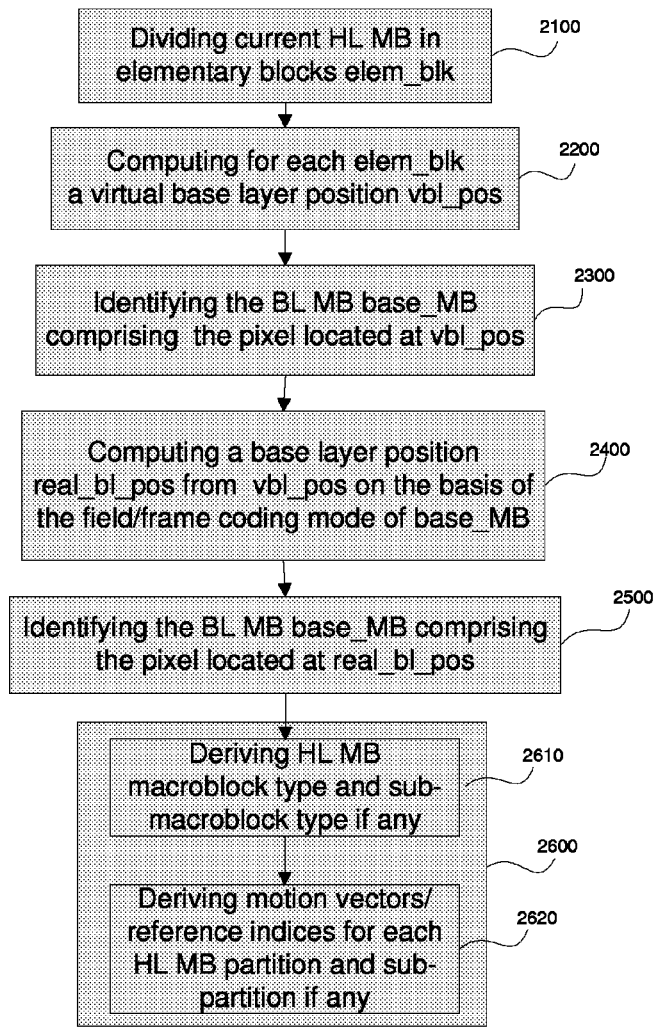
FIG. 2 depicts a flowchart of the method according to the invention.
Figure 3:
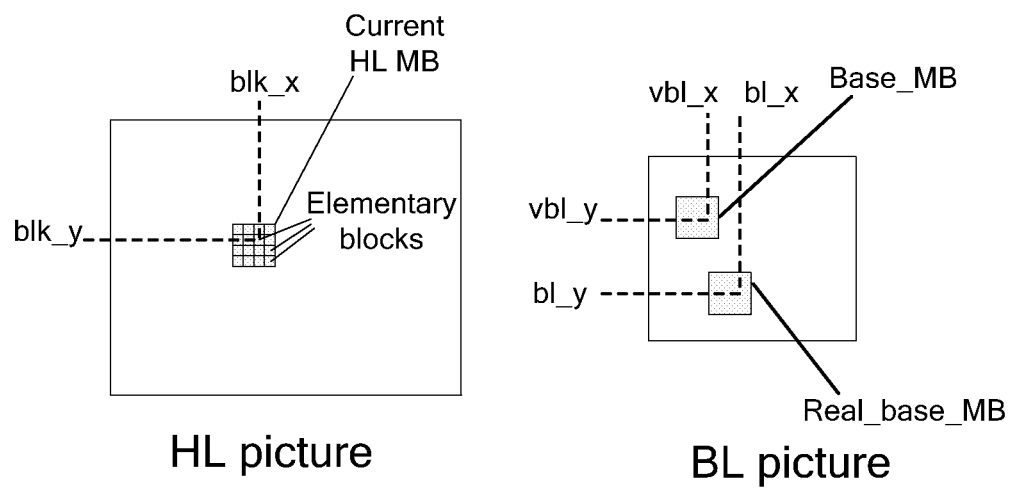
FIG. 3 depicts an example of motion data derivation for a given high layer macroblock.

The method for deriving motion data for at least one HL MB from BL MB(s) is described below in reference to FIG. 2 for a current HL MB. In FIG. 2, the represented boxes are purely functional entities, which do not necessarily correspond to physical separated entities. Namely, they could be developed in the form of software, or be implemented in one or several integrated circuits. FIG. 3 depicts an example of such derivation for a current HL MB. Advantageously, according to this method, motion data for HL MB is directly derived from motion data of BL MB, i.e. no motion data is explicitly derived for intermediate macroblocks such as virtual base layer macroblocks (also known as VBL MBs). This significantly simplifies the whole process. Indeed, it is not required anymore to derive motion data for intermediate MBs associated to the current HL MB before deriving its own motion data. Advantageously, this method avoids deriving several times motion data for a same VBL MB which is associated to different neighbouring HL MBs.

According to this method, the current HL MB is first divided (step 2100) in high layer elementary blocks elem_blk (for example 4×4 blocks) as depicted on FIG. 3.

Then, the method consists in computing (step 2200), for each block elem_blk at position (blk_x, blk_y) (in pixel unit), a virtual base layer position vbl_pos=(vbl_x, vbl_y) as follows:

$$vbl\_x = blk\_x * w_{base}/w_{enh}; \text{ and}$$

$$vbl\_y = \text{offset} + \text{factor} * (y1 * hb/he)$$

where offset, factor and hb are parameters defined as follows:
if one of the two following conditions is true:
current HL MB is a field macroblock, and base layer picture is encoded in macroblock adaptive frame field (MBAFF) mode or
current HL MB is a field macroblock, and the base layer picture is progressive and $h_{enh} < 2*h_{base}$;
then factor=2, hb=$h_{base}$/2 and offset=0 if high layer macroblock is a TOP macroblock or offset=16 if high layer macroblock is a BOTTOM macroblock;
otherwise, factor=1, hb=$h_{base}$ and offset=0;
and where y1 and he are parameters defined as follows:
If current HL MB is a field macroblock, and if the high layer picture is encoded in macroblock adaptive frame field (MBAFF) mode, then y1=blk_y/2 and he=$h_{enh}$/2.
otherwise, y1=blk_y and he=$h_{enh}$.

The step 2300 consists in identifying, for each elem_blk, the base layer macroblock base_MB comprising the pixel of position vbl_pos in the base layer picture, i.e. the pixel of coordinates (vbl_x, vbl_y), as depicted on FIG. 3.

Then, at step 2400, a base layer position real_bl_pos= (bl_x, bl_y) within the low resolution picture is computed, for each elem_blk, from the virtual base layer position vbl_pos on the basis of the frame/field coding mode of the base_MB. bl_x is set equal to vbl_x and bl_y is derived as follows:
If the following conditions are true:
Base layer picture is encoded in macroblock adaptive frame field (MBAFF) mode;
base layer macroblock base_MB is a field macroblock; and
high layer picture is progressive (i.e. encoded in frame mode) or high layer macroblock is a frame macroblock.
then a field to frame conversion of the virtual base layer position vbl_pos is applied. The address of a given macroblock at position (ax,ay) in a picture of w columns is defined as (ay*w+ax). Let mbAddrBaseTOP and mbAddrBaseBOT be defined as follows:
If base_MB is a TOP macroblock, then mbAddrBaseTOP is the address of base_MB and mbAddrBaseBOT is the address of the base layer macroblock located below base_MB, otherwise mbAddrBaseBOT is the address of base_MB and mbAddrBaseTOP is the address of the base layer macroblock located above the base_MB.
Therefore, if macroblocks at position mbAddrBaseTOP and mbAddrBaseBOT are both intra coded then bl_y=vbl_y, otherwise, let $y_2$ be a variable set equal to (vbl_y % 16)/4 and mbAddrBase be defined as follows:

If $y_2$ is lower than 2, mbAddrBase=mbAddrBaseTOP
Else mbAddrBase=mbAddrBaseBOT
If base_MB is a TOP macroblock, then bl_y=(mbAddrBase/ $w_{base}$)+4*(blk_y/2) otherwise, bl_y=(mbAddrBase/$w_{base}$)+ 4*(blk_y/2+2).
Otherwise, if one of the following conditions is true:
Base layer picture is progressive (i.e. encoded in frame mode) and current HL MB is a field macroblock and $h_{enh} < 2*h_{base}$;
Base layer picture is encoded in macroblock adaptive frame field (MBAFF) mode and base layer macroblock base_MB is a frame macroblock and high layer macroblock is a field macroblock
then a frame to field conversion of the virtual base layer position vbl_pos is applied. Let mbAddrBaseTOP and mbAddrBaseBOT be defined as follows: If base_MB is a TOP macroblock, mbAddrBaseTOP is the address of base_MB and mbAddrBaseBOT is the address of the base layer macroblock located below base_MB, otherwise mbAddrBaseBOT is the address of base_MB and mbAddrBaseTOP is the address of the base layer macroblock located up to base_MB.
Therefore, if macroblocks at position mbAddrBaseTOP and mbAddrBaseBOT are both intra coded, then bl_y=vbl_y, otherwise, if macroblock at position mbAddrBaseTOP is intra coded, mbAddrBaseTOP is set to mbAddrBaseBOT, otherwise if macroblock at position mbAddrBaseBOT is intra coded, mbAddrBaseBOT is set to mbAddrBaseTOP. Let $y_2$ be a variable set equal to (vbl_y % 16)/4 and mbAddrBase be defined as follows:
If y2 is lower than 2, mbAddrBase=mbAddrBaseTOP
Else mbAddrBase=mbAddrBaseBOT
If base_MB is a TOP macroblock, then bl_y=(mbAddrBase/ $w_{base}$)+4*(2*(blk_y%2)) otherwise, bl_y=(mbAddrBase/ $w_{base}$)+4*(2*(blk_y%2)+1).
Otherwise, bl_y=vbl_y.

The step 2500 consists in identifying, for each elem_blk, the base layer macroblock real_base_MB comprising the pixel in the base layer picture of position real_bl_pos=(bl_x, bl_y), the index mbPartIdxBase of the base layer partition comprising the pixel of position real_bl_pos within the base layer macroblock real_base_MB, and the index subMbPartIdxBase of base layer sub-partition if any comprising the pixel of position real_bl_pos within the base layer partition of index mbPartIdxBase. Said real_base_MB, said mbPartIdxBase index and subMbPartIdxBase index if any are associated to said elem_blk.

Next step 2600 consists in deriving motion data associated to current HL MB. Preferentially, the motion data derivation step comprises two sub-step. Indeed, a macroblock type mb_type and sub-macroblock types are first derived before deriving motion vectors and reference indices. More precisely, the sub-step 2610, consists in deriving the macroblock type mb_type, i.e. a portioning pattern, and possible sub-macroblock types sub_mb_type (the sub_mb_type specifies how a given partition is split, for example, an 8×8 partition whose sub_mb_type is 8×4 is divided in two 8×4 sub-partitions) of current HL MB, using the process defined in section F.6.4 'Derivation process for macroblock type and sub-macroblock type in inter-layer prediction' of document JVT of ISO/IEC MPEG & ITU-T VCEG JVT-S202 entitled "Joint Scalable Video Model JSVM-6: Joint Draft 6 with proposed changes" starting at the following lines:
The element partInfo[x, y] is derived as follows.
If mbAddrBase is marked as not available, partInfo[x, y] is marked as not available.
Otherwise, the following applies.

If macroblock mbAddrBase is intra coded, $$partInfo[x,y] = -1 \quad \text{(F-43)}$$

Otherwise, $$partInfo[x,y] = 16*mbAddrBase+4*mbPartIdxBase+subMbPartIdxBase \quad \text{(F-44)}$$

Finally, motion vectors and reference indices are derived at sub-step 2620, for each partition and possible sub-partition of current HL MB, from motion vectors and reference indices of the base layer partition or sub-partition if any of the real_base_MBs associated to each elem_blk of said current HL MB, on the basis of the frame or field mode of the HL MB and of the frame or field mode of the base layer macroblock real_base_MB, as described in section F.8.6 'Resampling process for motion data' of document JVT of ISO/IEC MPEG & ITU-T VCEG JVT-S202.

The method according to the invention may be used by a process for coding video signals and by a process for decoding video signals. When used by a process for coding video signals, the encoding process selects to encode current HL MB using either an inter-layer prediction mode or a classical prediction mode.

Figure 4:
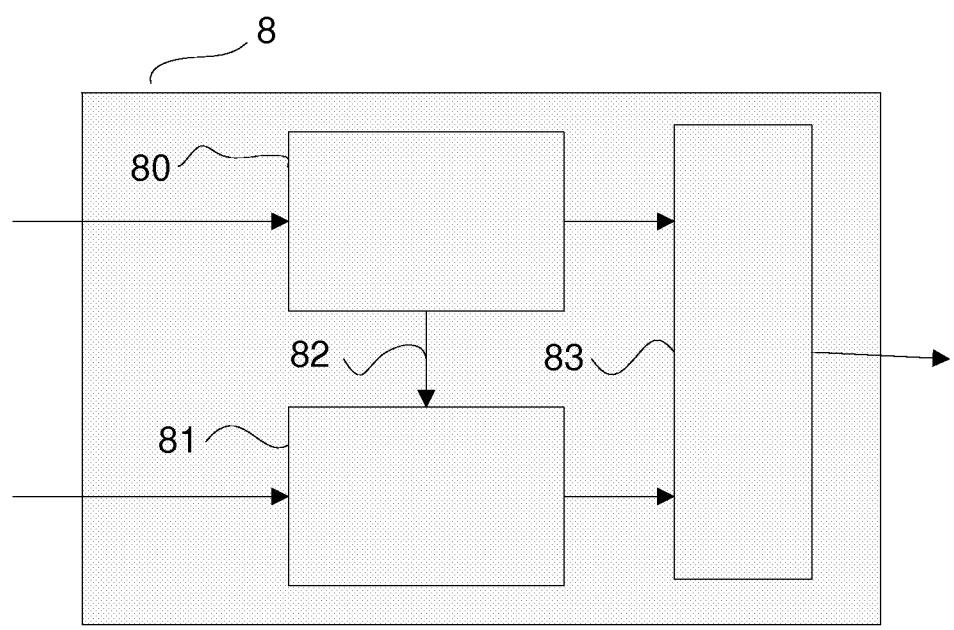
FIG. 4 depicts a coding device for coding video signals according to the invention.

The invention also concerns a coding device 8 depicted on FIG. 4. The coding device 8 comprises a first coding module 80 for coding the low resolution pictures. The module 80 generates a base layer data stream and motion data for said low resolution pictures. Preferentially the module 80 is adapted to generate a base layer data stream compatible with MPEG4 AVC standard. The coding device 8 comprises inheritance means 82 used to derive motion data for high resolution pictures from the motion data of the low resolution pictures generated by the first coding module 80. The inheritance means 82 are adapted to implement the steps 2100 to 2600 of the method according to the invention. The coding device 8 comprises a second coding module 81 for coding the high resolution pictures. The second coding module 81 uses the motion data derived by the inheritance means 82 in order to encode the high resolution pictures. The second coding module 81 thus generates an enhancement layer data stream. Preferentially, the coding device 8 also comprises a module 83 (for example a multiplexer) that combines the base layer data stream and the enhancement layer data stream provided by the first coding module 80 and the second coding module 81 respectively to generate a single data stream. Therefore, if a HL MB is encoded by the second coding module 81 using the inter-layer prediction mode, the motion data related to said HL MB are not coded in the data stream (or only partly coded since quarter-pel motion refinement may possibly be coded) since they are derived from the motion data related to the BL MBs that are provided by the module 80. This allows to save some bits. On the other hand, if a HL MB is encoded using a classical mode (e.g. bidirectional mode) then motion data related to said HL MB are coded in the data stream.

Figure 5:
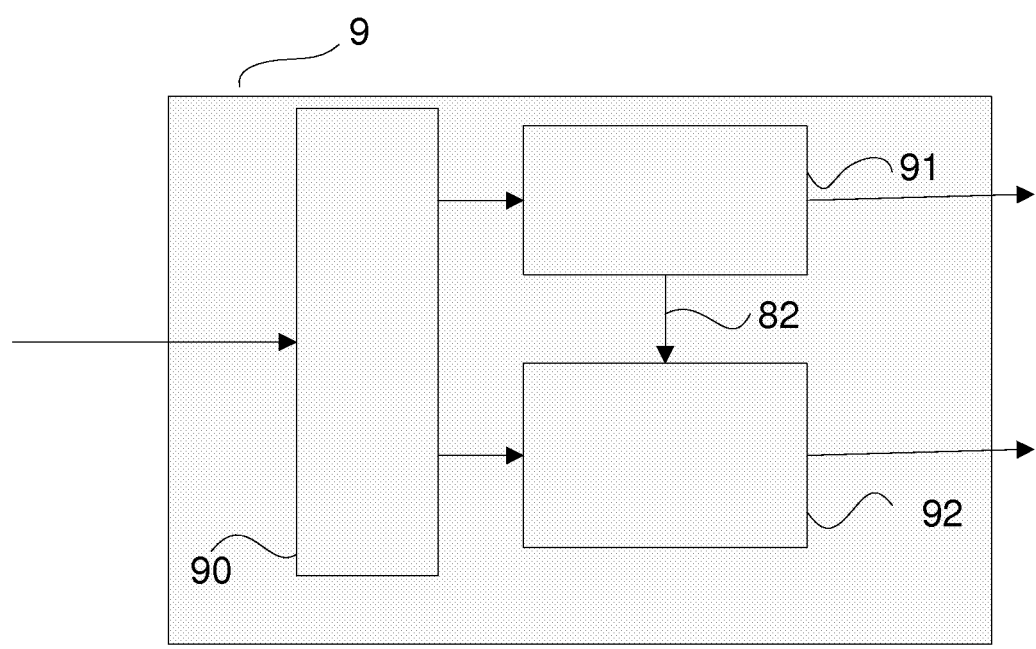
FIG. 5 depicts a decoding device for decoding video signals according to the invention.

The invention also concerns a decoding device 9 depicted on FIG. 5 for decoding high resolution pictures from a data stream generated with the coding device 8. The decoding device 9 comprises a first decoding module 91 for decoding a first part of the data stream, called base layer data stream, in order to derive low resolution pictures and motion data for said low resolution pictures. Preferentially the module 91 is adapted to decode a data stream compatible with MPEG4 AVC standard. The decoding device 9 comprises inheritance means 82 used to derive motion data for high resolution pictures from the motion data of the low resolution pictures generated by the first decoding module 91. The inheritance means 82 are adapted to implement the steps 2100 to 2600 of the method according to the invention. The decoding device 9 comprises a second decoding module 92 for decoding a second part of the data stream, called enhancement layer data stream. The second decoding module 92 uses the motion data derived by the inheritance means 82 in order to decode a second part of the data stream. The second decoding module 92 thus generates the high resolution pictures. Advantageously, the device 9 comprises also an extracting module 90 (e.g. a demultiplexer) for extracting from the received data stream the base layer data stream and the enhancement layer data stream.

According to another embodiment the decoding device receives two data streams: a base layer data stream and an enhancement layer data stream. In this case the device 9 does not comprise an extracting module 90.

The invention is not limited to the embodiments described. Particularly, the invention described for two sequences of pictures, i.e. two spatial layers, may be used to encode more than two sequences of pictures.

The invention claimed is:

1. Method, as part of a coding or decoding process, for deriving motion data for at least one high layer macroblock, divided into non-overlapping elementary blocks, of a high resolution picture from motion data associated with base layer macroblocks of a low resolution picture, whatever the format of said high and low resolution pictures is, a macroblock coding mode among frame mode and field mode being associated with each macroblock and a picture coding mode among field picture mode and frame picture mode being associated with said high resolution picture and with said low resolution picture, said method comprising:

computing, for each elementary block of said at least one macroblock, an intermediate position within said low resolution picture from said elementary block position within said high resolution picture depending on the coding mode of said high layer macroblock and depending on the picture coding modes of said high and low resolution pictures;

identifying, for each elementary block, the base layer macroblock, called base macroblock, comprising the pixel located at said intermediate position;

computing, for each elementary block, a final position within said low resolution picture, called real base layer position, from said intermediate position depending on the coding modes of said base macroblock and high layer macroblocks;

identifying, for each elementary block of said at least one macroblock, the base layer macroblock, called real base macroblock, comprising the pixel located at said real base layer position; and deriving motion data, for said high layer macroblock, from motion data of said real base macroblock for each elementary block.

2. Method according to claim 1, wherein base layer macroblocks are partitioned and motion data is associated with each of the partitions and wherein said method further comprises identifying, for each elementary block, the partition of said real base macroblock comprising the pixel located at said real base layer position after identifying, for each elementary block, the base layer macroblock, called real base macroblock, comprising the pixel located at said real base layer position.

3. Method according to claim 2, wherein deriving motion data for said high layer macroblock comprises:

partitioning said high layer macroblock depending on said real base macroblock and on said identified partitioning of said real base macroblock for each elementary block; and deriving motion vectors for each partition of said high layer macroblock from motion data of said real base macroblock for each elementary block.

4. Method according to claim 1, wherein said high layer macroblock is a block of 16 by 16 pixels and wherein each elementary block is a block of 4 by 4 pixels.

5. Device for coding a sequence of high resolution pictures and a sequence of low resolution pictures whatever the format of said high and low resolution pictures is, each picture being divided in non overlapping macroblocks divided into non-overlapping elementary blocks, a macroblock coding mode among frame mode and field mode being associated with each macroblock and a picture coding mode among field picture mode and frame picture mode being associated with said high resolution pictures and with said low resolution pictures, said device comprising:

a first coding module configured to code said low resolution pictures, said first coding module generating motion data for macroblocks of said low resolution pictures and a base layer data stream;

inheritance module configured to derive motion data for at least one macroblock of a high resolution picture, called high layer macroblock from motion data of macroblocks a low resolution picture, called base layer macroblocks; and a second coding module configured to code said high resolution pictures using said derived motion data, said second coding module generating an enhancement layer data stream;

wherein the inheritance module is configured to:

compute, for each elementary block of said at least one macroblock, an intermediate position within said low resolution picture from said elementary block position within said high resolution picture depending on the coding mode of said high layer macroblock and depending on the picture coding modes of said high and low resolution pictures;

identify, for each elementary block, the base layer macroblock, called base macroblock, comprising the pixel located at said intermediate position;

compute, for each elementary block, a final position within said low resolution picture, called real base layer position, from said intermediate position depending on the coding modes of said base macroblock and high layer macroblocks;

identify, for each elementary block of said at least one macroblock, the base layer macroblock, called real base macroblock, comprising the pixel located at said real base layer position; and derive motion data, for said high layer macroblock, from motion data of said real base macroblock for each elementary block.

6. Device according to claim 5, wherein said first coding module is an MPEG-4 AVC video encoder.

7. Device according to claim 5, wherein said device further comprises a multiplexer configured to combine base layer data stream and enhancement layer data stream into a single data stream.

8. Device for decoding at least a sequence of high resolution pictures from low resolution pictures whatever the format of said high and low resolution pictures is, the coded pictures arising in the form of a data stream, each picture being divided in non overlapping macroblocks divided into non-overlapping elementary blocks, a macroblock coding mode among frame mode and field mode being associated with each macroblock and a picture coding mode among field picture mode and frame picture mode being associated with said high resolution pictures and with said low resolution pictures, said device comprising:

a first decoding module configured to decode at least a first part of said data stream in order to generate said low resolution pictures and motion data for macroblocks of said low resolution picture;

inheritance module configured to derive motion data for at least one macroblock of a high resolution picture, called high layer macroblock, from motion data of macroblocks of a low resolution picture, called base layer macroblocks; and a second decoding module configured to decode at least a second part of said data stream using said derived motion data in order to generate high resolution pictures;

wherein the inheritance module is configured to:

compute, for each elementary block of said at least one macroblock, an intermediate position within said low resolution picture from said elementary block position within said high resolution picture depending on the coding mode of said high layer macroblock and depending on the picture coding modes of said high and low resolution pictures;

identify, for each elementary block, the base layer macroblock, called base macroblock, comprising the pixel located at said intermediate position;

compute, for each elementary block, a final position within said low resolution picture, called real base layer position, from said intermediate position depending on the coding modes of said base macroblock and high layer macroblocks;

identify, for each elementary block of said at least one macroblock, the base layer macroblock, called real base macroblock, comprising the pixel located at said real base layer position; and derive motion data, for said high layer macroblock, from motion data of said real base macroblock for each elementary block.

9. Device according to claim 8, wherein said first decoding module is an MPEG-4 AVC video decoder.

10. A device for deriving motion data for at least one high layer macroblock, divided into non-overlapping elementary blocks, of a high resolution picture from motion data associated with base layer macroblocks of a low resolution picture, whatever the format of said high and low resolution pictures is, a macroblock coding mode among frame mode and field mode being associated with each macroblock and a picture coding mode among field picture mode and frame picture mode being associated with said high resolution picture and with said low resolution picture, said device comprising:

an integrated circuit configured to compute, for each elementary block of said at least one macroblock, an intermediate position within said low resolution picture from said elementary block position within said high resolution picture depending on the coding mode of said high layer macroblock and depending on the picture coding modes of said high and low resolution pictures; identify, for each elementary block, the base layer macroblock, called base macroblock, comprising the pixel located at said intermediate position; compute, for each elementary block, a final position within said low resolution picture, called real base layer position, from said intermediate position depending on the coding modes of said base macroblock and high layer macroblocks; identify, for each elementary block of said at least one macroblock, the base layer macroblock, called real base macroblock, comprising the pixel located at said real base layer position; and derive motion data, for said high layer macroblock, from motion data of said real base macroblock for each elementary block.

11. The device according to claim 10, wherein base layer macroblocks are partitioned and motion data is associated with each of the partitions and wherein said integrated circuit is further configured to identify, for each elementary block, the partition of said real base macroblock comprising the pixel located at said real base layer position after identifying, for each elementary block, the base layer macroblock, called real base macroblock, comprising the pixel located at said real base layer position.

12. The device according to claim 11, wherein deriving motion data for said high layer macroblock comprises:
  partitioning said high layer macroblock depending on said real base macroblock and on said identified partitioning of said real base macroblock for each elementary block; and
  deriving motion vectors for each partition of said high layer macroblock from motion data of said real base macroblock for each elementary block.

13. The device according to claim 10, wherein said high layer macroblock is a block of 16 by 16 pixels and wherein each elementary block is a block of 4 by 4 pixels.

14. Device for coding a sequence of high resolution pictures and a sequence of low resolution pictures whatever the format of said high and low resolution pictures is, each picture being divided in non overlapping macroblocks divided into non-overlapping elementary blocks, a macroblock coding mode among frame mode and field mode being associated to with each macroblock and a picture coding mode among field picture mode and frame picture mode being associated with said high resolution pictures and with said low resolution pictures, said device comprising:
  first coding means for coding said low resolution pictures, said first coding module generating motion data for macroblocks of said low resolution pictures and a base layer data stream;
  inheritance means for deriving motion data for at least one macroblock of a high resolution picture, called high layer macroblock from motion data of macroblocks a low resolution picture, called base layer macroblocks; and
  second coding means for coding said high resolution pictures using said derived motion data, said second coding module generating an enhancement layer data stream;
wherein the inheritance means comprise:
  means for computing, for each elementary block of said at least one macroblock, an intermediate position within said low resolution picture from said elementary block position within said high resolution picture depending on the coding mode of said high layer macroblock and depending on the picture coding modes of said high and low resolution pictures;
  means for identifying, for each elementary block, the base layer macroblock, called base macroblock, comprising the pixel located at said intermediate position;
  means for computing, for each elementary block, a final position within said low resolution picture, called real base layer position, from said intermediate position depending on the coding modes of said base macroblock and high layer macroblocks;
  means for identifying, for each elementary block of said at least one macroblock, the base layer macroblock, called real base macroblock, comprising the pixel located at said real base layer position; and
  means for deriving motion data, for said high layer macroblock, from motion data of said real base macroblock for each elementary block.

15. Device according to claim 12, wherein said first coding means are an
MPEG-4 AVC video encoder.

16. Device according to claim 12, wherein said device further comprises a multiplexer configured to combine base layer data stream and enhancement layer data stream into a single data stream.

17. Device for decoding at least a sequence of high resolution pictures from low resolution pictures whatever the format of said high and low resolution pictures is, the coded pictures arising in the form of a data stream, each picture being divided in non overlapping macroblocks divided into non-overlapping elementary blocks, a macroblock coding mode among frame mode and field mode being associated with each macroblock and a picture coding mode among field picture mode and frame picture mode being associated with said high resolution pictures and with said low resolution pictures, said device comprising:
  first decoding means for decoding at least a first part of said data stream in order to generate said low resolution pictures and motion data for macroblocks of said low resolution picture;
  inheritance means for deriving motion data for at least one macroblock of a high resolution picture, called high layer macroblock, from motion data of macroblocks of a low resolution picture, called base layer macroblocks; and
  second decoding means for decoding at least a second part of said data stream using said derived motion data in order to generate high resolution pictures;
wherein the inheritance means comprise:
  means for computing, for each elementary block of said at least one macroblock, an intermediate position within said low resolution picture from said elementary block position within said high resolution picture depending on the coding mode of said high layer macroblock and depending on the picture coding modes of said high and low resolution pictures;
  means for identifying, for each elementary block, the base layer macroblock, called base macroblock, comprising the pixel located at said intermediate position;
  means for computing, for each elementary block, a final position within said low resolution picture, called real base layer position, from said intermediate position depending on the coding modes of said base macroblock and high layer macroblocks;
  means for identifying, for each elementary block of said at least one macroblock, the base layer macroblock, called real base macroblock, comprising the pixel located at said real base layer position; and
  means for deriving motion data, for said high layer macroblock, from motion data of said real base macroblock for each elementary block.

18. Device according to claim 15, wherein said first decoding means are an MPEG-4 AVC video decoder.

* * * * *